(12) United States Patent
Ikeda

(10) Patent No.: US 11,702,135 B2
(45) Date of Patent: Jul. 18, 2023

(54) WORK VEHICLE

(71) Applicant: Kubota Corporation, Osaka (JP)

(72) Inventor: Ryo Ikeda, Sakai (JP)

(73) Assignee: Kubota Corporation, Osaka (JP)

( * ) Notice: Subject to any disclaimer, the term of this patent is extended or adjusted under 35 U.S.C. 154(b) by 378 days.

(21) Appl. No.: 16/882,891

(22) Filed: May 26, 2020

(65) Prior Publication Data

US 2021/0086831 A1 Mar. 25, 2021

(30) Foreign Application Priority Data

Sep. 24, 2019 (JP) ................................ 2019-173044

(51) Int. Cl.
| | |
|---|---|
| *B62D 11/04* | (2006.01) |
| *B62D 11/00* | (2006.01) |
| *A01D 34/00* | (2006.01) |
| *A01D 34/82* | (2006.01) |
| *B60Q 5/00* | (2006.01) |
| *A01D 34/64* | (2006.01) |
| *A01D 34/78* | (2006.01) |
| *A01D 101/00* | (2006.01) |

(52) U.S. Cl.
CPC .......... *B62D 11/001* (2013.01); *A01D 34/006* (2013.01); *A01D 34/824* (2013.01); *A01D 34/828* (2013.01); *B60Q 5/005* (2013.01); *B62D 11/04* (2013.01); *A01D 34/64* (2013.01); *A01D 34/78* (2013.01); *A01D 2101/00* (2013.01)

(58) Field of Classification Search
CPC ..... B62D 11/001; B62D 11/04; B62D 11/003; A01D 34/006; A01D 34/824; A01D 34/828; A01D 34/64; A01D 34/78; A01D 2101/00; A01D 69/02; A01D 34/66; B60Q 5/005; B60T 7/085; B60T 7/102; B60T 7/104; B60T 7/107
See application file for complete search history.

(56) References Cited

U.S. PATENT DOCUMENTS

| | | | |
|---|---|---|---|
| 6,434,917 | B1 | 8/2002 | Bartel |
| 2006/0172857 | A1* | 8/2006 | Eavenson, Sr. ...... B62D 11/006 477/203 |
| 2008/0190084 | A1 | 8/2008 | Piontek |
| 2009/0000839 | A1 | 1/2009 | Ishii et al. |
| 2012/0095636 | A1 | 4/2012 | Ishii et al. |
| 2012/0159916 | A1 | 6/2012 | Ishii et al. |
| 2013/0199364 | A1* | 8/2013 | Weiberle ............... B60T 8/4077 92/261 |
| 2014/0059989 | A1 | 3/2014 | Ishii et al. |

(Continued)

FOREIGN PATENT DOCUMENTS

| | | |
|---|---|---|
| EP | 1943894 A2 | 7/2008 |
| JP | H9112584 A | 5/1997 |

*Primary Examiner* — Minnah L Seoh
*Assistant Examiner* — Marlon A Arce
(74) *Attorney, Agent, or Firm* — The Webb Law Firm

(57) ABSTRACT

A brake control unit configured to control a brake to a braked state in response to a brake position sensor having detected that a steering lever has been operated to a stop position and to a released state in response to the brake position sensor having detected that the steering lever has been operated from the stop position toward a travel operation pathway and a travel position sensor having detected that the steering lever is at a neutral position, at which the steering lever is placeable to stop travel.

9 Claims, 3 Drawing Sheets

(56) References Cited

U.S. PATENT DOCUMENTS

| | | |
|---|---|---|
| 2016/0029555 A1 | 2/2016 | Ishii et al. |
| 2017/0107695 A1* | 4/2017 | Fukuda ................ E02F 9/2228 |
| 2019/0111789 A1 | 4/2019 | Matsuda et al. |
| 2019/0357429 A1* | 11/2019 | Andre .................. F02D 41/021 |
| 2021/0195834 A1* | 7/2021 | Arendt ................ G05D 1/0236 |

* cited by examiner

WORK VEHICLE

CROSS REFERENCE TO RELATED APPLICATION

This application claims priority to Japanese Patent Application No. 2019-173044 filed Sep. 24, 2019, the disclosure of which is hereby incorporated by reference in its entirety.

TECHNICAL FIELD

The present invention relates to a work vehicle including a control lever for causing the work vehicle to travel and setting a brake to the braked state.

BACKGROUND ART

A work vehicle including a vehicle body is configured to be reliably kept standing in response to a brake having been set to the braked state. An operation to set the brake of the work vehicle to the braked state may be carried out together with control of the vehicle body with use of control levers for a simple operation.

For example, for a work vehicle disclosed in Patent Literature 1 (namely, "combine" in Patent Literature 1), if a control lever (namely, "shift lever" in Patent Literature 1) has been kept at a neutral position for a certain length of time, the brake is operated to the braked state.

Further, for a work vehicle disclosed in Patent Literature 2, by operating control levers forward or rearward to a neutral position and then respectively in the left and right directions, the brakes are operated to the braked state.

CITATION LIST

Patent Literature

Patent Literature 1: Japanese Patent Application Publication No. 9-112584
Patent Literature 2: U.S. Pat. No. 6,434,917, specification

SUMMARY OF INVENTION

Technical Problem

The operation position of a control lever is detected with use of a position sensor. Thus, a malfunction in the position sensor may set the brake to the released state contrary to the driver's intention or cause the vehicle body to abruptly start traveling immediately after the brake is released. For instance, for the work vehicle disclosed in Patent Literature 1, a malfunction in the position sensor may set the brake to the released state on the basis of an erroneous determination that the control lever has been operated from the neutral position despite the control lever being actually at the neutral position. For the work vehicle disclosed in Patent Literature 2, if the position sensor has erroneously determined the position of the control lever in the front-rear direction when the control levers have been operated in the left and right directions respectively to operate the brakes to the released state, the vehicle body may abruptly start traveling immediately after the brake is released.

It is an object of the present invention to enable appropriate release of a brake even in the case where traveling of a work vehicle and the state of a brake are operated with use of a control lever.

Solution to Problem

In order to attain the above object, a work vehicle according to an embodiment of the present invention comprises at least one traveling device; a brake configured to brake the traveling device; at least one steering lever configured to operate travel by the traveling device; an operation pathway within which the steering lever is operable, the operation pathway including: a travel operation pathway corresponding to a traveling speed of the traveling device; and a stop operation pathway extending from a stop position, at which the steering lever is placeable to set the brake to a braked state, to the travel operation pathway; a travel position sensor configured to detect an operation position of the steering lever within the travel operation pathway; a brake position sensor configured to detect an operation position of the steering lever within the stop operation pathway; a drive unit configured to drive the traveling device; a travel control unit configured to control the drive unit on a basis of a detected value from the travel position sensor; and a brake control unit configured to control the brake to the braked state in response to the brake position sensor having detected that the steering lever has been operated to the stop position and to a released state in response to the brake position sensor having detected that the steering lever has been operated from the stop position toward the travel operation pathway and the travel position sensor having detected that the steering lever is at a neutral position, at which the steering lever is placeable to stop the travel.

The above configuration allows a brake in the braked state to be set to the released state only if the control lever has become apart from the stop position, and additionally the travel position sensor has detected that the control lever is at the neutral position. Thus, the work vehicle can be prevented from starting to travel erroneously as a result of a malfunction of the travel position sensor, and it is possible to release the brake appropriately.

The work vehicle may preferably be configured such that the traveling device is configured to travel forward and rearward; the stop operation pathway is in contact with the travel operation pathway at the neutral position; the stop position is far from the travel operation pathway; and the travel operation pathway includes a forward travel operation pathway and a rearward travel operation pathway with the neutral position therebetween.

With the above configuration, a control lever can be operated to smoothly control traveling of the work vehicle including control of the brake, and it is thereby possible to release the brake appropriately.

The work vehicle may be configured such that the neutral position is a position of a predetermined range within the travel operation pathway.

With the above configuration, the steering lever has a certain dead zone for the neutral position. By allowing the travel position sensor to detect that the steering lever is at the neutral position if the steering lever is present within a certain zone, the configuration of the release of the brake matches the actual travel mode. This improves operability of the work vehicle.

The work vehicle may be configured such that the traveling device is a pair of left and right traveling devices; the steering lever is a pair of steering levers in one-to-one correspondence with the pair of left and right traveling devices; and the brake control unit is configured to set the brake to the released state only in response to the travel position sensor having detected that each of the pair of steering levers is at the neutral position.

Driving only one of the traveling devices causes the work vehicle to travel. With the above configuration, the brake can be set to the released state only when both of the steering levers have been operated to release the brake. Thus, it is possible to more accurately prevent the work vehicle from starting to travel erroneously and release the brakes appropriately.

The work vehicle may be configured such that an alarm device, wherein the brake control unit is configured to cause the alarm device to function in an event of the travel position sensor having detected that the steering lever is at a position other than the neutral position while the brake position sensor has detected that the steering lever is at the stop position.

With the above configuration, it is possible to notice the possibility of a malfunction of the travel position sensor early and to take a necessary measure early.

DESCRIPTION OF EMBODIMENTS

[Basic Configuration of Electric Mower]

The description below deals with a work vehicle as an example embodiment of the present invention. Unless otherwise stated, the present specification uses the word "forward" to refer to a forward direction in relation to the front-rear direction (traveling direction) of the vehicle body, the word "rearward" to refer to a rearward direction in relation to the front-rear direction (traveling direction) of the vehicle body, the terms "left-right direction" and "lateral direction" to refer to the transverse direction (width direction) of the vehicle body, which is orthogonal to the front-rear direction of the vehicle body, and the words "upward" and "downward" to refer to a position in the vertical direction of the vehicle body, that is, a height from the ground.

Figure 1:
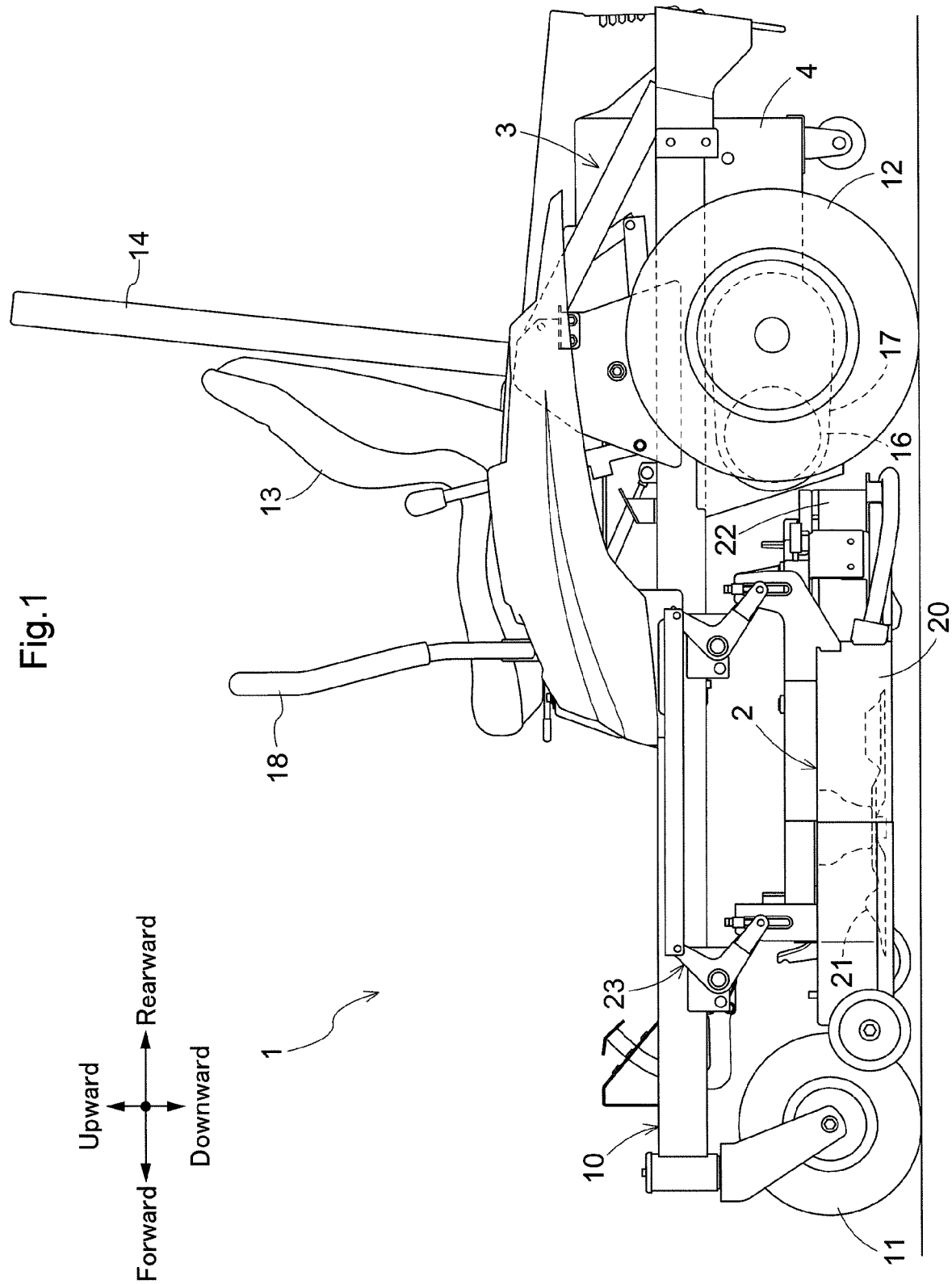
FIG. 1 is a left side view of an electric mower.
Figure 2:
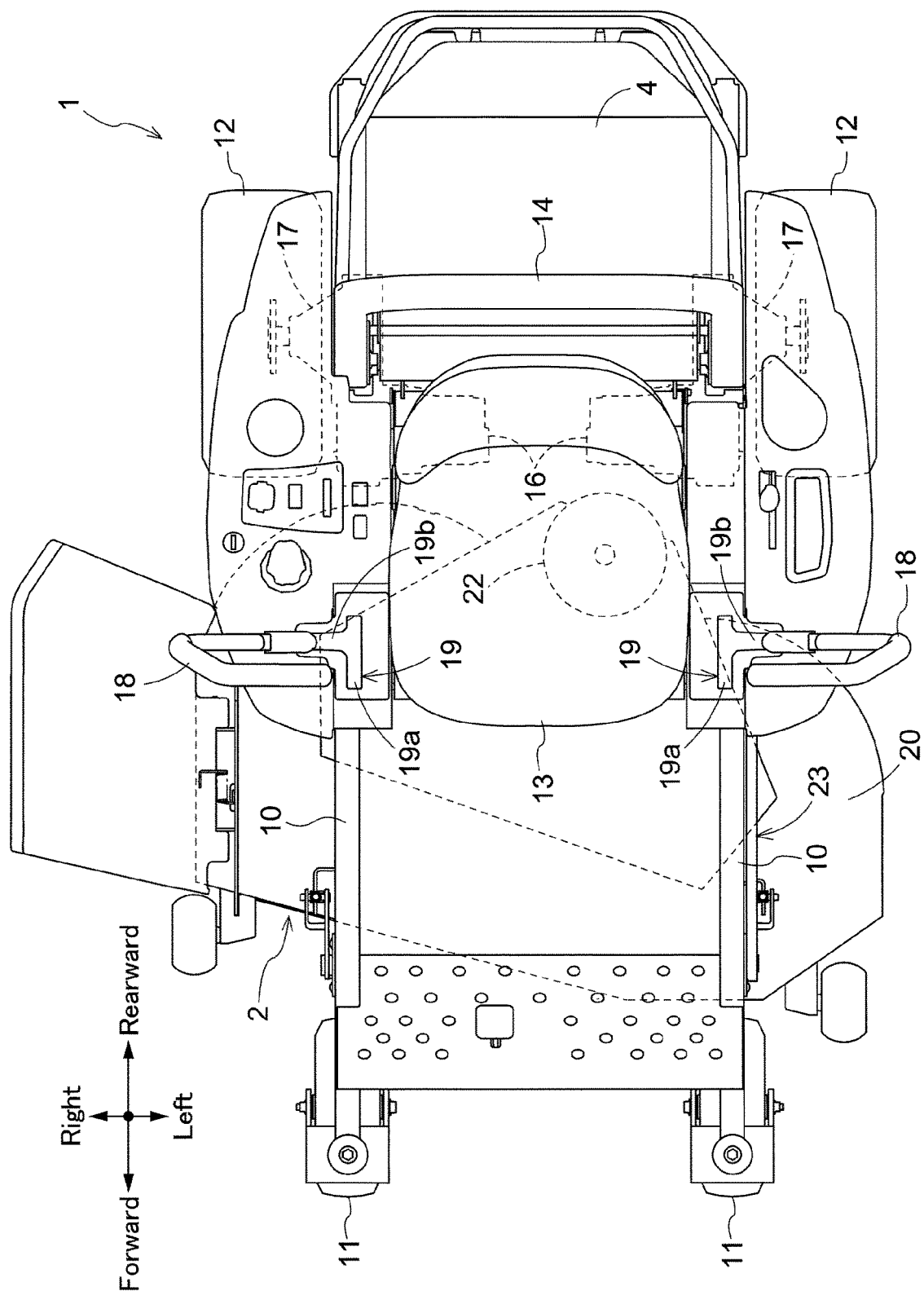
FIG. 2 is a plan view of an electric mower.

FIGS. 1 and 2 each illustrate an electric mower as an example work vehicle. The electric mower includes a vehicle body 1, a pair of left and right front wheels 11,11, a pair of left and right rear wheels 12,12, a mower unit 2, and a battery housing part 3. The pair of left and right front wheels 11,11 are provided at a front portion of the vehicle body 1, whereas the pair of left and right rear wheels 12,12 are provided at a rear portion of the vehicle body 1. The mower unit 2 is supported at a lower portion of the vehicle body 1, between the pair of left and right front wheels 11,11 and the pair of left and right rear wheels 12,12 in the front-rear direction and between the left front and rear wheels 11 and 12 and the right front and rear wheels 11 and 12 in the left-right direction. The battery housing part 3 is supported at a rear portion of the vehicle body 1, between the pair of left and right rear wheels 12,12.

The vehicle body 1 includes a frame 10, and also includes at an upper portion of the vehicle body 1 such members such a driver's seat 13 for an operator to sit on and a ROPS frame 14. The driver's seat 13 is supported by the frame 10. The ROPS frame 14 has a lower portion connected with the frame 10.

A pair of left and right travel motors 16,16 and a pair of left and right deceleration mechanisms 17,17 are provided at a rear portion of the frame 10. The travel motor 16 on the right side of the vehicle body (vehicle body 1) produces power, which is transmitted via the deceleration mechanism 17 on the right side of the vehicle body to the rear wheel 12 on the right side of the vehicle body. The travel motor 16 on the left side of the vehicle body produces power, which is transmitted via the deceleration mechanism 17 on the left side of the vehicle body to the rear wheel 12 on the left side of the vehicle body.

A pair of left and right steering levers 18,18 are provided to the left and right of the driver's seat 13, respectively. Each steering lever 18 is operated within a predetermined operation pathway 19. The operation pathway 19 includes a travel operation pathway 19a and a stop operation pathway 19b. The travel operation pathway 19a is made up of a pathway for changing the speed of forward travel and a pathway for changing the speed of rearward travel, the two pathways being arranged in the front-rear direction of the vehicle body with a neutral position therebetween. The stop operation pathway 19b extends in the left or right direction of the vehicle body and is in contact with the travel operation pathway 19a at the neutral position. The steering lever 18 on the right side of the vehicle body can be operated along the stop operation pathway 19b extending to the right of the neutral position. The steering lever 18 on the left side of the vehicle body can be operated along the stop operation pathway 19b extending to the left of the neutral position. When the operator has operated the steering lever 18 on the right side of the vehicle body to the neutral position, the travel motor 16 on the right side of the vehicle body stops. When the operator has operated the steering lever 18 on the right side of the vehicle body to the forward travel side, the travel motor 16 on the right side of the vehicle body rotates in the direction for forward travel. When the operator has operated the steering lever 18 on the right side of the vehicle body to the rearward travel side, the travel motor 16 on the right side of the vehicle body rotates in the direction for rearward travel. When the operator has operated the steering lever 18 on the right side of the vehicle body from the neutral position in the right direction up to the end of the stop operation pathway 19b, a parking brake (corresponding to the "brake") for the rear wheel 12 on the right side of the vehicle body is set to the braked state. The travel motor 16 on the left side of the vehicle body operates similarly to the above when the operator has operated the steering lever 18 on the left side of the vehicle body to the neutral position, in the direction of forward travel, in the direction of rearward travel, and to the left end of the stop operation pathway 19b. This configuration allows each travel motor 16 to drive the rear wheel 12 as a travel wheel. This means that the operator can operate the left and right steering levers 18,18 independently to drive the left and right rear wheels 12,12 independently, thereby allowing the electric mower to travel and turn.

The steering levers 18,18 may be provided through a steering panel (not illustrated in the drawings) in the vicinity of the driver's seat 13. In this case, the operation pathway 19 may be in the form of a slot in the steering panel. The steering levers 18,18 are operated along the slot.

The mower unit 2 includes a housing unit 20, a cutting blade 21, a cutting blade motor 22, and a link mechanism 23. The housing unit 20 has a lower portion that is open downward, and contains the cutting blade 21 and the cutting blade motor 22. The cutting blade 21 is thus covered by the housing unit 20 on the front, rear, left, and right sides as well as in the upward direction. The cutting blade 21 is rotatable with use of power from the cutting blade motor 22 about a vertical axis inside the housing unit 20. The housing unit 20 is suspended from the frame 10 vertically movably with use of the link mechanism 23.

The battery housing part 3 is, as described above, provided at a rear portion of the vehicle body 1, and is capable of containing a battery unit 4. The battery unit 4 is configured to supply electric power to members such as the travel motors 16 and the cutting blade motor 22.

[Steering Levers]

Figure 3:
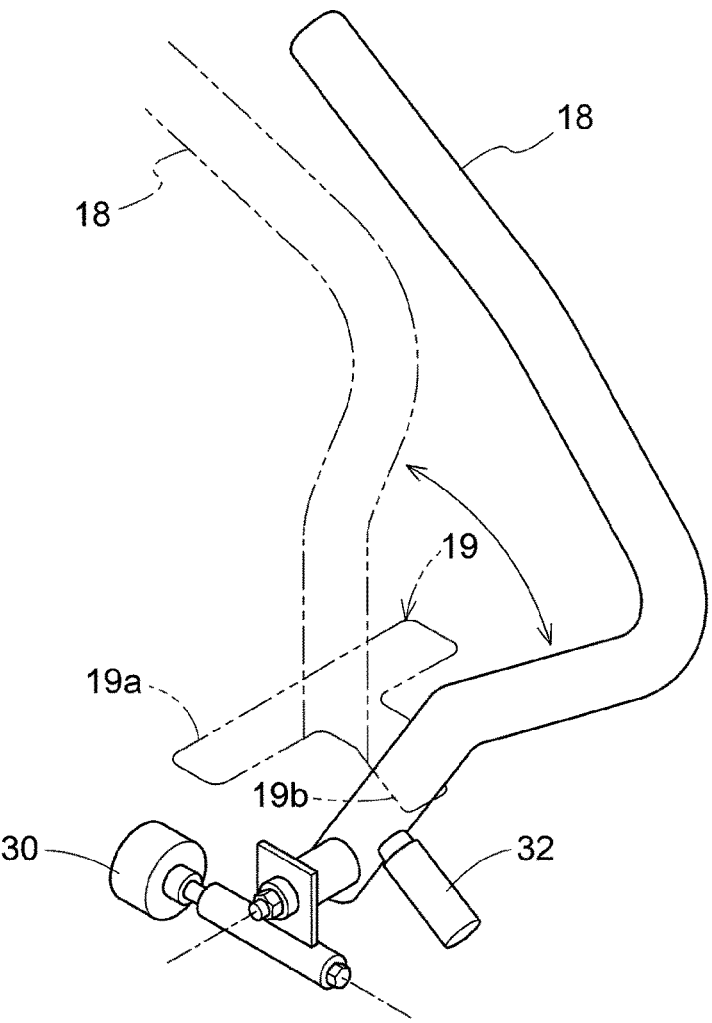
FIG. 3 is a conceptual diagram illustrating an example of arrangement for detection of the position of a steering lever.
Figure 4:
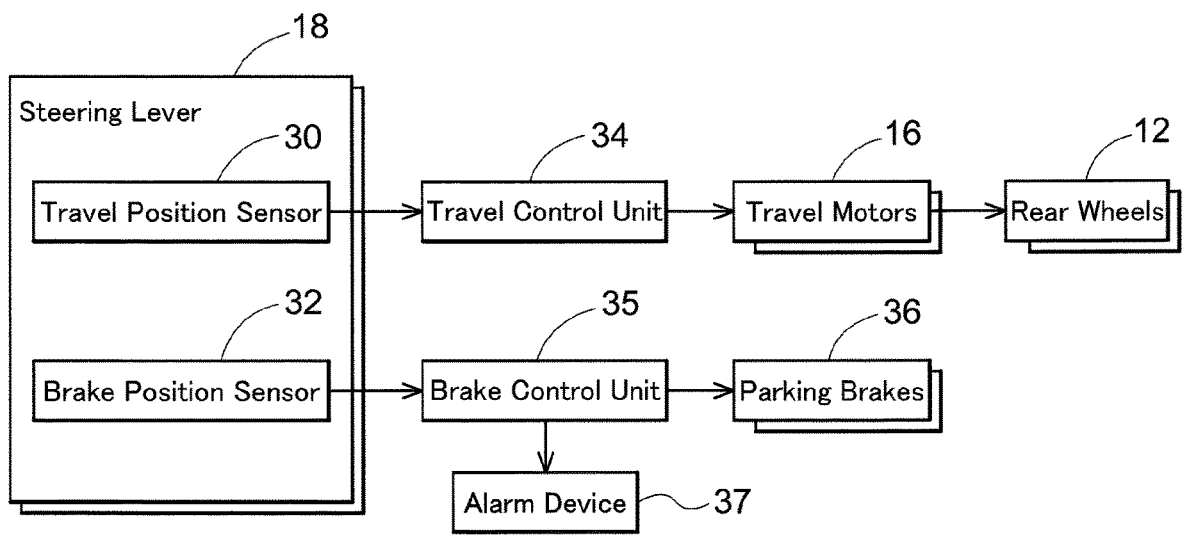
FIG. 4 is a block diagram illustrating an example of arrangement for control of operations carried out with use of a steering lever.

With reference to FIGS. 3 and 4, the description below deals with detection of the position of a steering lever 18 and control of travel with use of a steering lever 18.

As described above, each steering lever 18 is operated within the operation pathway 19, within which the steering lever 18 can be operated. Depending on the operation position of each steering lever 18, forward and rearward travel of the electric mower is controlled, and the parking brake 36 (corresponding to the "brake") is controlled to the braked state or the released state. Each steering lever 18 is thus provided with a travel position sensor 30 and a brake position sensor 32 that are configured to detect the operation position of the steering lever 18 within the operation pathway 19.

The travel position sensor 30 detects the operation position of the steering lever 18 within the travel operation pathway 19a of the operation pathway 19. Specifically, the travel position sensor 30 detects whether the steering lever 18 is at the neutral position within the travel operation pathway 19a and at which position the steering lever 18 is on the forward or rearward travel side within the travel operation pathway 19a. The travel position sensor 30 detects the operation position of the steering lever 18 within the travel operation pathway 19a, and transmits the detected value to a travel control unit 34 and a brake control unit 35 to control travel of the electric mower.

The travel control unit 34 controls travel of the electric mower on the basis of the detected value of the travel position sensor 30. The travel of the electric mower depends on the direction and speed of rotation of the rear wheels 12 (corresponding to the "traveling device"). The rear wheels 12 are, as described above, driven by the travel motors 16 (corresponding to the "drive unit"). The travel control unit 34 controls the travel motors 16 on the basis of the detected value of the travel position sensor 30. This allows the travel control unit 34 to control the rotation of the rear wheels 12 and thereby control the travel of the electric mower. As described above, a pair of steering levers 18 are provided in one-to-one correspondence with the pair of left and right rear wheels 12. Operating the pair of steering levers 18 separately allows the left and right rear wheels 12 to be operated separately. Based on operations such as the difference between the respective speeds of the left and right rear wheels 12, the electric mower can turn.

The brake position sensor 32 is provided near that end of each stop operation pathway 19b which is apart from the travel operation pathway 19a. The brake position sensor 32 detects whether the steering lever 18 has come into contact with the brake position sensor 32 to detect whether the steering lever 18 is at a stop position at that end of the stop operation pathway 19b which is apart from the travel operation pathway 19a. The brake position sensor 32 transmits information on the detection result to the brake control unit 35. The brake control unit 35 then controls the parking brake 36 to the braked state or the released state on the basis of the detection result transmitted from the brake position sensor 32.

Moving both of the steering levers 18 to the neutral positions within the travel operation pathways 19a during travel causes the electric mower to stop. Then, operating each of the steering levers 18 toward outside the vehicle body and up to the stop position within the stop operation pathway 19b causes the brake position sensor 32 to detect the steering lever 18. The brake position sensor 32, when it has detected the steering lever 18, transmits to the brake control unit 35 a brake signal, which is a signal indicative of the detection. The brake control unit 35, when it has received the brake signal, sets the parking brake 36 to the braked state to stop rotation of the rear wheel 12. Operating one of the left and right steering levers 18 to the stop position may set only the parking brake 36 for the rear wheel 12 to the braked state. It may be only when both of the steering levers 18 have been operated to the stop positions that both of the parking brakes 36 become set to the braked state at the same time.

When a steering lever 18 has been operated away from the stop position, the brake position sensor 32 does not detect the steering lever 18. The brake position sensor 32 then transmits to the brake control unit 35 a release signal, which is a signal indicative of the brake position sensor 32 not detecting the steering lever 18. Moving the steering lever 18 further within the stop operation pathway 19b up to the neutral position causes the travel position sensor 30 to detect that the steering lever 18 has been operated to the neutral position. The travel position sensor 30 then transmits to the brake control unit 35 information on a detected value corresponding to the operation position of the steering lever 18, the detected value including information on whether the steering lever 18 is at the neutral position.

With a parking brake 36 in the braked state, even if the brake control unit 35 has received from the brake position sensor 32 a release signal indicating that the steering lever 18 has become apart from the stop position within the stop operation pathway 19b, the brake control unit 35 maintains the braked state as long as the detected value received from the travel position sensor 30 is not a detected value corresponding to the neutral position. With a parking brake 36 in the braked state, if the brake control unit 35 has received a release signal from the brake position sensor 32 and the detected value received from the travel position sensor 30 is a detected value corresponding to the neutral position, the brake control unit 35 controls the parking brake 36 to the released state.

As described above, when setting the brake control unit 35 a parking brake 36 in the braked state to the released state, the brake control unit 35 does not set the parking brake 36 to the released state even if the brake position sensor 32 has detected that the steering lever 18 has become apart from the stop position, as long as the travel position sensor 30 has not detected that the steering lever 18 is at the neutral position. Only if the brake position sensor 32 has detected that the steering lever 18 has become apart from the stop position, and additionally the travel position sensor 30 has detected that the steering lever 18 is at the neutral position, the brake control unit 35 sets the parking brake 36 to the released state.

A parking brake 36 in the braked state could be set to the released state on the basis of only the detected value of the brake position sensor 32. However, suppose that the travel position sensor 30 is defective and has erroneously determined that a steering lever 18 is at a position for travel while it is actually at the neutral position. In such a case, operating the steering lever 18 away from the stop position may abruptly cause the electric mower to start traveling, contrary to the driver's intention. The present embodiment is, in contract, configured as described above to set a parking brake 36 in the braked state to the released state on both the conditions that the brake position sensor 32 has detected that the steering lever 18 has become apart from the stop position and that the travel position sensor 30 has detected that the steering lever 18 is at the neutral position. With this configuration, while the travel position sensor 30 has not detected that the steering level 18 is at the neutral position, the electric mower remains standing, and since the travel motor 16 is not driven, it is possible to prevent the electric mower from starting to travel abruptly and to release the parking brake 36 appropriately even in the event of a parking brake 36 becoming released.

OTHER EMBODIMENTS (1) The electric mower may further include an alarm device 37. In this case, the brake control unit 35 is configured to cause the alarm device 37 to function in the event of the travel position sensor 30 having detected that a steering lever 18 is at a position other than the neutral position despite the brake position sensor 32 having detected that the steering lever 18 is at the stop position. The alarm device 37 thus sounds an alarm for warning.

In the case where the travel position sensor 30 has detected that a steering lever 18 is at a position for forward or rearward travel despite the steering lever 18 being at the stop position, it means that the travel position sensor 30 has detected as such erroneously. The travel control unit 34, in response to the detection, causes the electric mower to travel, which is contrary to the driver's intention. The alarm device 37 is capable of notifying the driver of the above state. The driver notified as such can take an appropriate measure early.

The alarm device 37 may be any alarm device such as a lamp, a loudspeaker, or a display device.

(2) For each of the embodiments described above, the neutral position, the operation position on the forward travel side, and the operation position on the rearward travel side are not necessarily arranged in a straight line within the travel operation pathway 19a, and may be arranged in any manner. Further, the travel operation pathway 19a and the stop operation pathway 19b may have any positional relationship with each other.

(3) For each of the embodiments described above, a steering lever 18 may have a certain dead zone for the neutral position, so that placing the steering lever 18 in the dead zone does not cause the electric mower to travel. This allows the travel position sensor 30 to detect that a steering lever 18 is at the neutral position if the steering lever 18 is present within a certain zone, and matches the actual travel mode, which is appropriate.

(4) The detection that a steering lever 18 is at the neutral position (which is a condition for whether to set the parking brake 36 to the released state) is not necessarily carried out by the travel position sensor 30. The detection may be performed by another position sensor operable in conjunction with the brake position sensor 32.

INDUSTRIAL APPLICABILITY

The present invention is applicable to not only electric mowers but also any work vehicle configured to be operated for travel.

REFERENCE SIGNS LIST

12 Rear wheel (traveling device)
16 Travel motor (drive unit)
18 Steering lever
19 Operation pathway
19a Travel operation pathway
19b Stop operation pathway
30 Travel position sensor
32 Brake position sensor
34 Travel control unit
35 Brake control unit
36 Parking brake (brake)

The invention claimed is:

1. A work vehicle, comprising:
at least one traveling device;
a brake configured to brake the traveling device;
at least one steering lever configured to operate travel by the traveling device;
an operation pathway within which the steering lever is operable, the operation pathway including:
  a travel operation pathway corresponding to a traveling speed of the traveling device; and
  a stop operation pathway extending from a stop position, at which the steering lever is placeable to set the brake to a braked state, to the travel operation pathway;
a travel position sensor configured to detect an operation position of the steering lever within the travel operation pathway;
a brake position sensor configured to detect an operation position of the steering lever within the stop operation pathway;
a drive unit configured to drive the traveling device;
a travel control unit configured to control the drive unit on a basis of a detected value from the travel position sensor; and
a brake control unit configured to control the brake to the braked state in response to the brake position sensor having detected that the steering lever has been operated to the stop position and to control the brake to a released state in response to the brake position sensor having detected that the steering lever has been operated from the stop position toward the travel operation pathway and the travel position sensor having detected that the steering lever is at a neutral position, at which the steering lever is placeable to stop the travel,
wherein the brake control unit is configured to maintain the braked state as long as the travel position sensor does not detect, in the braked state, that the steering lever is at the neutral position, even if the steering lever has become apart from the stop position.

2. The work vehicle according to claim 1, wherein
the traveling device is configured to travel forward and rearward;
the stop operation pathway is in contact with the travel operation pathway at the neutral position;
the stop position is far from the travel operation pathway; and
the travel operation pathway includes a forward travel operation pathway and a rearward travel operation pathway with the neutral position therebetween.

3. The work vehicle according to claim 1, wherein
the neutral position is a position of a predetermined range within the travel operation pathway.

4. The work vehicle according to claim 1, wherein the traveling device is a pair of left and right traveling devices;

the steering lever is a pair of steering levers in one-to-one correspondence with the pair of left and right traveling devices; and the brake control unit is configured to set the brake to the released state only in response to the travel position sensor having detected that each of the pair of steering levers is at the neutral position.

5. The work vehicle according to claim 1, wherein an alarm device, wherein the brake control unit is configured to cause the alarm device to function in an event of the travel position sensor having detected that the steering lever is at a position other than the neutral position while the brake position sensor has detected that the steering lever is at the stop position.

6. A work vehicle, comprising:

at least one traveling device;

a brake configured to brake the traveling device;

at least one steering lever configured to operate travel by the traveling device;

an operation pathway within which the steering lever is operable, the operation pathway including:
  a travel operation pathway corresponding to a traveling speed of the traveling device; and
  a stop operation pathway extending from a stop position, at which the steering lever is placeable to set the brake to a braked state, to the travel operation pathway;

a travel position sensor configured to detect an operation position of the steering lever within the travel operation pathway;

a brake position sensor configured to detect an operation position of the steering lever within the stop operation pathway;

a drive unit configured to drive the traveling device;

a travel control unit configured to control the drive unit on a basis of a detected value from the travel position sensor; and a brake control unit configured to control the brake to the braked state in response to the brake position sensor having detected that the steering lever has been operated to the stop position and to control the brake to a released state in response to the brake position sensor having detected that the steering lever has been operated from the stop position toward the travel operation pathway and the travel position sensor having detected that the steering lever is at a neutral position, at which the steering lever is placeable to stop the travel; and an alarm device, wherein the brake control unit is configured to cause the alarm device to function in an event of the travel position sensor having detected that the steering lever is at a position other than the neutral position while the brake position sensor has detected that the steering lever is at the stop position.

7. The work vehicle according to claim 6, wherein the traveling device is configured to travel forward and rearward;

the stop operation pathway is in contact with the travel operation pathway at the neutral position;

the stop position is far from the travel operation pathway; and the travel operation pathway includes a forward travel operation pathway and a rearward travel operation pathway with the neutral position therebetween.

8. The work vehicle according to claim 6, wherein the neutral position is a position of a predetermined range within the travel operation pathway.

9. The work vehicle according to claim 6, wherein the traveling device is a pair of left and right traveling devices;

the steering lever is a pair of steering levers in one-to-one correspondence with the pair of left and right traveling devices; and the brake control unit is configured to set the brake to the released state only in response to the travel position sensor having detected that each of the pair of steering levers is at the neutral position.

* * * * *